(12) United States Patent
Wilson et al.

(10) Patent No.: US 7,312,995 B2
(45) Date of Patent: Dec. 25, 2007

(54) COOLING SYSTEM FOR COMPUTER ELECTRONICS

(75) Inventors: Michael J. Wilson, Racine, WI (US); Jonathan P. Wattelet, Gurnee, IL (US); Donald S. Lightner, Franksville, WI (US); Richard M. DeKeuster, Racine, WI (US)

(73) Assignee: Modine Manufacturing Company, Racine, WI (US)

( * ) Notice: Subject to any disclaimer, the term of this patent is extended or adjusted under 35 U.S.C. 154(b) by 157 days.

(21) Appl. No.: 11/266,812

(22) Filed: Nov. 4, 2005

(65) Prior Publication Data

US 2007/0103867 A1 May 10, 2007

(51) Int. Cl.
*H05K 7/20* (2006.01)
*F28F 7/00* (2006.01)

(52) U.S. Cl. ............... 361/701; 165/80.4; 165/121; 361/699; 361/696; 361/702; 361/695; 454/184

(58) Field of Classification Search ........... 361/696, 361/701–702
See application file for complete search history.

(56) References Cited

U.S. PATENT DOCUMENTS

| | | | | |
|---|---|---|---|---|
| 5,535,094 A | * | 7/1996 | Nelson et al. | ............... 361/697 |
| 6,234,240 B1 | * | 5/2001 | Cheon | .................. 165/80.3 |
| 6,263,957 B1 | * | 7/2001 | Chen et al. | ............... 165/80.4 |
| 6,587,343 B2 | * | 7/2003 | Novotny et al. | ............ 361/698 |
| 6,749,102 B2 | * | 6/2004 | Yamano et al. | ........... 228/110.1 |
| 6,809,928 B2 | * | 10/2004 | Gwin et al. | ................. 361/699 |
| 7,013,959 B2 | * | 3/2006 | Lee et al. | ............... 165/104.33 |
| 2005/0168939 A1 | * | 8/2005 | Iijima | ......................... 361/687 |
| 2006/0137863 A1 | * | 6/2006 | Lee et al. | ............... 165/104.33 |

* cited by examiner

*Primary Examiner*—Gregory D Thompson
(74) *Attorney, Agent, or Firm*—Wood, Phillips, Katz, Clark & Mortimer

(57) ABSTRACT

A cooling system is provided for supplying a coolant flow to a cold plate associated with a processing chip of an electronic device to cool the processing chip. The system includes an electric motor driven fan; a radiator; an accumulator tank connected to the radiator for the transfer of coolant between the accumulator and the radiator; an electric driven pump connected to at least one of the radiator, the accumulator, and the cold plate to provide the coolant flow through the radiator and the cold plate; and a fan shroud adapted to direct the airflow provided by the fan. The fan, the radiator, the accumulator tank, and the pump are mounted on the shroud to be carried thereby, and the pump is located on an exterior side of the of the fan shroud and outside of the radiator and the accumulator tank.

12 Claims, 3 Drawing Sheets

COOLING SYSTEM FOR COMPUTER ELECTRONICS

FIELD OF THE INVENTION

The invention relates generally to the cooling of computer or processor-based systems, and particularly to liquid cooling of such systems.

BACKGROUND OF THE INVENTION

There is an ever-increasing demand for processing power and size reduction in the computer and processing industry. However, size reduction and increases in processing power result in heat rejection requirements that are increasingly difficult to satisfy, particularly with air cooled heat exchange techniques alone. Accordingly, there is a continuing need to provide improved cooling systems in this area.

SUMMARY OF THE INVENTION

In accordance with one feature of the invention, a cooling system is provided for supplying a coolant flow to at least one cold plate associated with a processing chip of an electronic device to cool the processing chip. The system includes an electric motor driven fan; an air-cooled radiator to transfer heat from a coolant flow to an air flow provided by the fan; an accumulator tank connected to the radiator for the transfer of coolant between the accumulator and the radiator; an electric driven pump connected to at least one of the radiator, the accumulator, and the at least one cold plate to provide the coolant flow through the radiator and the at least one cold plate; and a fan shroud adapted to direct the airflow provided by the fan. The fan, the radiator, the accumulator tank, and the pump are mounted on the shroud to be carried thereby, and the pump is located on an exterior side of the of the fan shroud and outside of the radiator and the accumulator tank.

According to one feature of the invention, an electronic device is provided and includes at least one processing chip; and a cooling system for cooling the processing chip. The cooling system includes at least one cold plate mounted adjacent the at least one processing chip to transfer heat from the processing chip to a coolant flow passing through the at least one cold plate; an electric motor driven fan; an air-cooled radiator to transfer heat from a coolant flow to an air flow provided by the fan; an accumulator tank connected to the radiator for the transfer of coolant between the accumulator and the radiator; an electric driven pump connected to at least one of the radiator, the accumulator, and the at least one cold plate to provide the coolant flow through the radiator and the at least one cold plate; and a fan shroud adapted to direct the airflow provided by the fan. The fan, the radiator, the accumulator tank, and the pump are mounted on the shroud, the shroud is mounted to the electronic device, and the pump is located on an exterior side of the of the fan shroud and outside of the radiator and the accumulator tank.

As one feature, the fan shroud surrounds both the radiator and the fan.

In one feature, the cooling system further includes a conduit connecting the pump to the radiator.

According to one feature, the fan is part of a pancake type electric fan unit.

In one feature, the radiator includes flat tubes extending between the accumulator tank and a manifold to direct the coolant flow therebetween. As a further feature, the radiator further includes serpentine fins extending between adjacent tubes.

DETAILED DESCRIPTION OF THE PREFERRED EMBODIMENT

Figure 1:
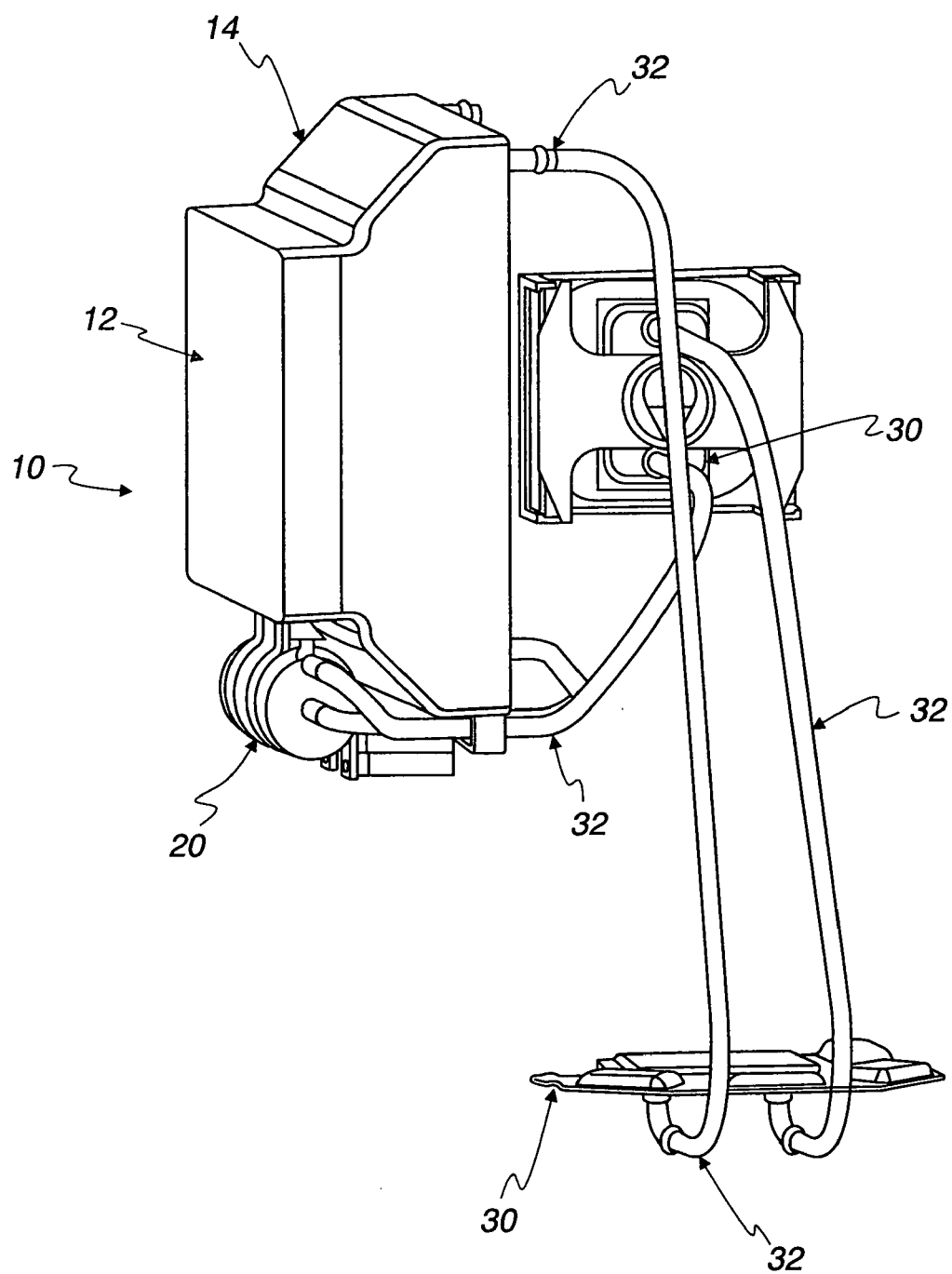
FIG. 1 is a perspective view of a cooling system embodying the present invention.
Figure 2:
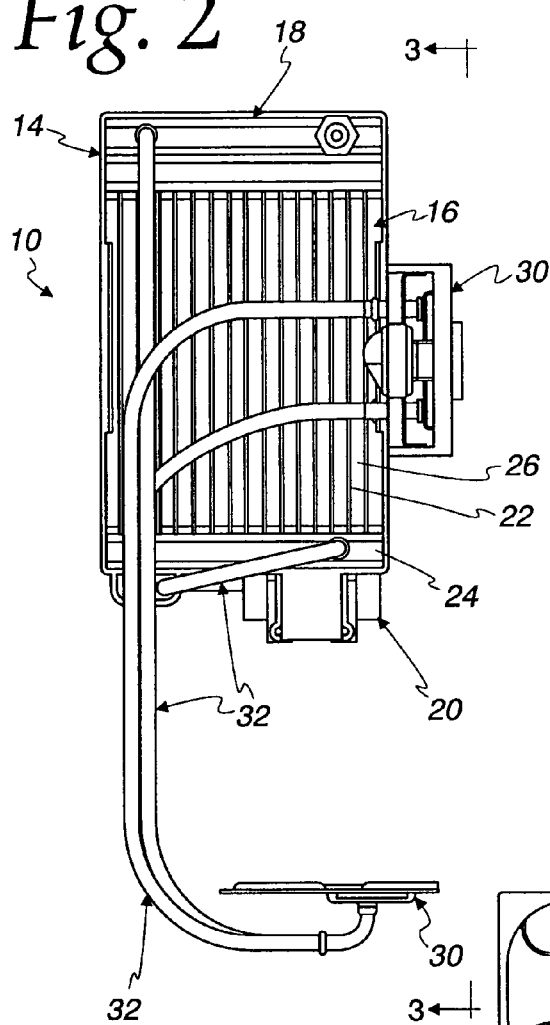
FIG. 2 is a front elevation of the cooling system 10 of FIG. 1.
Figure 3:
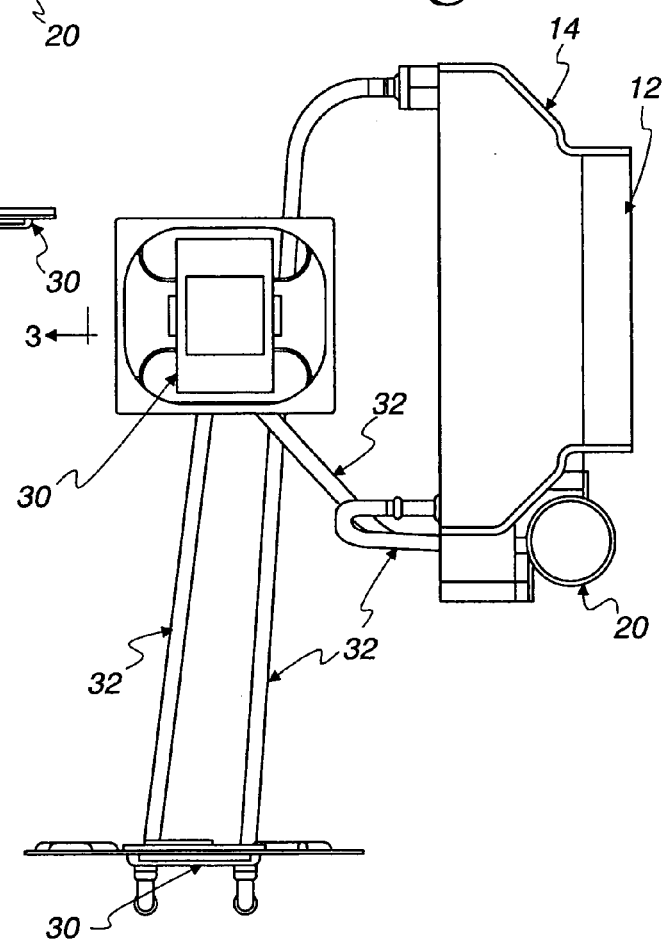
FIG. 3 is a view taken from line 3-3 in FIG. 2.
Figure 4:
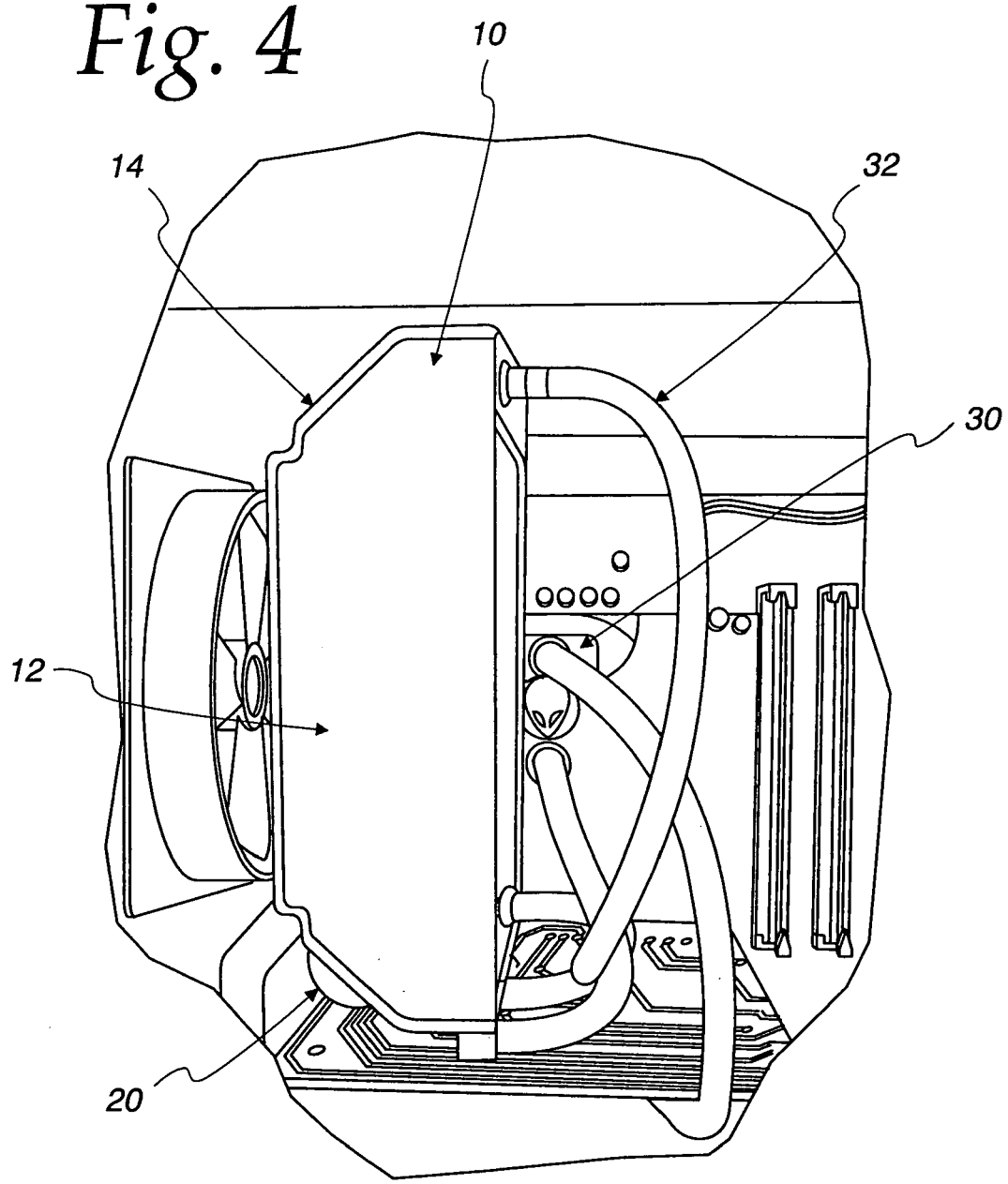
FIG. 4 is a view showing the system 10 mounted in a computer chassis.

As shown in the FIGS. 1-4, a cooling system 10 is provided for cooling a processing chip of a computer or other electronic component. The system 10 includes an electric motor driven fan, shown generally at 12, a fan shroud 14, a radiator 16, an accumulator tank 18, and an electric driven pump 20 for pumping coolant through the radiator 16 and the rest of the system 10. The fan shroud 14 serves as the system's chassis and mounts the pump 20, fan 12, radiator 16, and accumulator tank 18.

The fan 12 can be of any suitable design, many of which are known in the computer and processing industry, such as, for example, a so-called pancake type electric fan unit 12. Similarly, the radiator 16 can be of any suitable design, but is shown in the preferred form as a parallel flow type unit with flat tubes 22 extending between the accumulator tank 18 and a manifold 24 to direct the coolant flow therebetween, with serpentine fins 26 extending between adjacent tubes 22. Similarly, the pump 20 can be any suitable electric driven pump for pumping coolant through the system 10.

In the preferred embodiment, the shroud 14 surrounds the fan 12 and the radiator 16 to direct the air flow provided by the fan through the radiator 16. The pump 20 is preferably mounted on an exterior side of the fan shroud 14, which allows for the pump 20 to be easily removed and repaired or replaced.

The system 10 is connected to one or more cold plates 30, each of which can be attached to a processing chip (not shown) so that heat can be rejected from the processing chip to the coolant flowing through the cold plate 30 and back to the radiator 16. Suitable coolant conduits 32 are provided to connect cold plates 30 and the pump 20 to the radiator 16. Another option for the system 10 is for the pump 20 to be connected directly to the radiator 16, rather than through a separate conduit 32.

It should be appreciated that by mounting all of the system components, with the exception of the cold plates 30 and conduits 32, on the fan shroud 14, the system 10 provides a very compact cooling system for utilization within a computer or other electronic device. The use of a single unit also reduces complications for assembly of the system into a computer or other electronic device. Preferably, the shroud 14 would be designed to fit industry standards configurations, such as for example, an Intel standard ATX chassis, a "typical PC" chassis and electronic enclosures.

The invention claimed is:

1. A cooling system for supplying a coolant flow to at least one cold plate associated with a processing chip of an electronic device to cool the processing chip, the system comprising:

an electric motor driven fan;

an air-cooled radiator to transfer heat from a coolant flow to an air flow provided by the fan;

an accumulator tank connected to the radiator for the transfer of the coolant between the accumulator and the radiator;

an electric driven pump connected to at least one of the radiator, the accumulator, and the at least one cold plate to provide the coolant flow through the radiator and the at least one cold plate; and a fan shroud adapted to direct the airflow provided by the fan, wherein the fan, the radiator, the accumulator tank, and the pump are mounted on the shroud to be carried thereby, and the pump is located on an exterior side of the of the fan shroud and outside of the radiator and the accumulator tank.

2. The system of claim 1 wherein the fan shroud surrounds both the radiator and the fan.

3. The system of claim 1 further comprising a conduit connecting the pump to the radiator.

4. The system of claim 1 wherein the fan is part of a pancake type electric fan unit.

5. The system of claim 1 wherein the radiator includes flat tubes extending between the accumulator tank and a manifold to direct the coolant flow therebetween.

6. The system of claim 5 wherein the radiator further includes serpentine fins extending between adjacent tubes.

7. An electronic device comprising;

at least one processing chip; and a cooling system for cooling the processing chip, the cooling system comprising at least one cold plate mounted adjacent the at least one processing chip to transfer heat from the processing chip to a coolant flow passing through the at least one cold plate;

an electric motor driven fan;

an air-cooled radiator to transfer heat from the coolant flow to an air flow provided by the fan;

an accumulator tank connected to the radiator for the transfer of the coolant between the accumulator and the radiator;

an electric driven pump connected to at least one of the radiator, the accumulator, and the at least one cold plate to provide the coolant flow through the radiator and the at least one cold plate; and a fan shroud adapted to direct the airflow provided by the fan, wherein the fan, the radiator, the accumulator tank, and the pump are mounted on the shroud, the shroud is mounted to the electronic device, and the pump is located on an exterior side of the of the fan shroud and outside of the radiator and the accumulator tank.

8. The electronic device of claim 7 wherein the fan shroud surrounds both the radiator and the fan.

9. The electronic device of claim 7 wherein the cooling system further comprises a conduit connecting the pump to the radiator.

10. The electronic device of claim 7 wherein the fan is part of a pancake type electric fan unit.

11. The electronic device of claim 7 wherein the radiator comprises flat tubes extending between the accumulator tank and a manifold to direct the coolant flow therebetween.

12. The electronic device of claim 11 wherein the radiator further comprises serpentine fins extending between adjacent tubes.

\* \* \* \* \*